US006668372B1

(12) United States Patent
Wu

(10) Patent No.: US 6,668,372 B1
(45) Date of Patent: Dec. 23, 2003

(54) SOFTWARE PROFILING METHOD AND APPARATUS

(75) Inventor: Youfeng Wu, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/417,495

(22) Filed: Oct. 13, 1999

(51) Int. Cl.[7] ................................................. G06F 9/44
(52) U.S. Cl. ....................... 717/130; 717/127; 717/131; 717/133
(58) Field of Search ................................ 717/126–132; 710/45; 711/219; 712/210–211

(56) References Cited

PUBLICATIONS

Ball, T., et al., "Efficient Path Profiling", *Proceedings of the 29th Annual IEEE/ACM International Symposium on Microarchitecture*, 46–57, (Dec. 2–4, 1996).

Ball, T., et al., "Optimally Profiling and Tracing Programs", *ACM Transactions on Programming Languages and Systems*, vol. 16(3), 1319–1360, (Jul. 1994).

Eichenberger, A.E., et al., "Efficient Edge Profiling for ILP–Processors", *Proceedings of PACT '98*, 1–10, (Oct. 12–18, 1998).

Knuth, D.E., et al., "Optimal Measurement Points For Program Frequency Counts", *BIT 13*, 318–322, (1973).

Merten, M.C., et al., "A Hardware–Drive Profiling Scheme for Identifying Program Hot Spots To Support Runtime Optimization", *Proceedings of the 26th International Symposium on Computer Architecture*, 136–147, (May 2–4, 1999).

Schnarr, E., et al., "Instruction Scheduling and Executable Editing", *Proceedings of the 29th Annual IEEE/ACM International Symposium on Microarchitecture*, 10 pgs., (Dec. 2–4, 1996).

*Primary Examiner*—Tuan Dam
*Assistant Examiner*—Ted T. Vo
(74) *Attorney, Agent, or Firm*—Schwegman, Lundberg, Woessner & Kluth, P.A.

(57) ABSTRACT

An efficient software profiling technique utilizes a combination of software resources and hardware resources. Control flow graphs are partitioned into single entry regions and then further into blocks. Blocks are separated into profiled blocks and non-profiled blocks. Each profiled block has an existing instruction modified, or an auxiliary instruction added, thereby allowing the generation of a profiling counter address with little or no overhead in terms of end-user program execution speed. A register set is maintained that defines the scope for functions or procedures. The register set includes a base address register and an offset register. Profile counter addresses are generated from the register contents and information included in instructions within profiled blocks.

38 Claims, 9 Drawing Sheets

SOFTWARE PROFILING METHOD AND APPARATUS

FIELD

The present invention relates generally to software, and more specifically to the profiling of software.

BACKGROUND

When software is compiled, it is converted from a high level "human readable" set of statements to a set of low level "machine readable" instructions. The control flow of the machine readable instructions can be very much like that of the human readable statements, or can be very different. During compilation, software can be "optimized" to increase the speed with which the final machine readable code executes.

Programs, or portions of programs, in addition to being optimized when compiled (i.e. at "compile-time"), can also be optimized when the software is executed (i.e. at "run-time"). This "dynamic optimization" can benefit from profiling information that typically includes the frequency with which portions of the program execute. Programs can be profiled while operating on test data, or while operating on actual end-user data. By profiling software in the end-user environment, the resulting profiling information reflects actual usage patterns, and can aid in the dynamic optimization process.

Efficient profiling at run-time can be difficult. Typical algorithms for collecting profiling information at run-time call for inserting extra program instructions into each profiled block of the end-user program. These algorithms can incur overhead penalties in the range of 3% to 40%. Examples of these algorithms can be found in: Thomas Ball & James Larus, "Optimally profiling and tracing programs," ACM Transactions on Programming Languages and Systems, 16(3): 1319–1360, July 1994; Thomas Ball & James Larus, "Efficient Path Profiling," MICRO-29, December 1996; and Alexandre Eichenberger & Sheldon M. Lobo, "Efficient edge profiling for ILP-processors," Proceedings of PACT '98," 12–18, October 1998.

For the reasons stated above, and for other reasons stated below which will become apparent to those skilled in the art upon reading and understanding the present specification, there is a need in the art for an alternate method and apparatus for profiling software.

SUMMARY

In one embodiment, a computer-implemented method of measuring a frequency of execution of a software program block includes reading a branch instruction from the software program block and decoding the branch instruction. The method further includes generating at least one update instruction to increment a counter, wherein the counter includes a counter value that represents the frequency of execution of the software program block.

In another embodiment, a method of instrumenting software includes inserting a profiling instruction configured to load a base address register in each compiled element, and separating each compiled element into at least one single-entry region. The method further includes inserting a second profiling instruction configured to load an offset register in at least one of the at least one single entry region, and modifying at least one instruction within at least one of the at least one single entry region to facilitate profiling of the at least one single-entry region.

In another embodiment, a method of profiling the execution of a software region includes reading an instrumented profiling instruction from the software region, extracting an identification (ID) value from the instrumented profiling instruction, and incrementing a value at a counter location, the counter location being a function of the ID value.

In another embodiment, a processor includes an execution unit configured to produce profiling information when encountering an instrumented program instruction in a user program, and a buffer adapted to receive the profiling information from the execution unit as the execution unit executes the user program. The profiling information of this embodiment can include a plurality of profile counter update instructions, and the processor can further include profiling hardware for executing the plurality of update instructions.

In another embodiment, a processing system includes a memory device and a motherboard configured to receive the memory device, and a processor coupled to the memory device and to the motherboard. In this embodiment, the processor can include a buffer for holding update instructions to be executed during free slots of a user program, and an execution unit configured to load the buffer after reading an instrumented profiling instruction from the memory.

DESCRIPTION OF EMBODIMENTS

Figure 1:
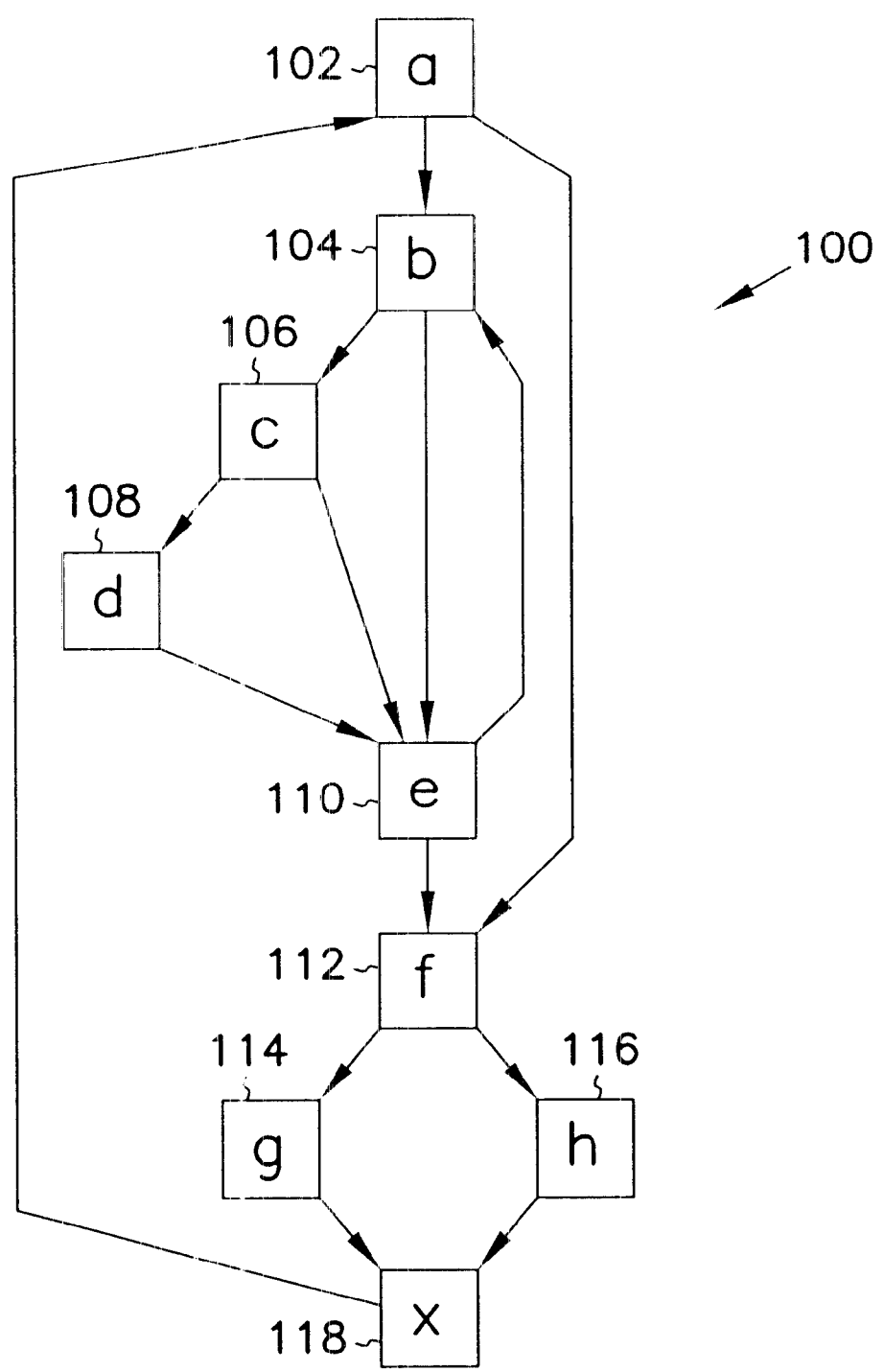
FIG. 1 shows a control flow graph of a software program.

In the following detailed description of the embodiments, reference is made to the accompanying drawings which form a part hereof, and in which is shown by way of illustration specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

FIG. 1 shows a control flow graph (CFG) of a software program. CFG 100 can represent an entire program or a portion of a program. For example, CFG 100 can represent the flow in a single function or procedure, or can represent the flow in many functions or procedures. For explanatory purposes, CFG 100 is discussed herein as a single function or procedure. CFG 100 is a graph having blocks, and having edges between blocks. In graph theory terms, blocks are vertices of the graph, and edges are arcs of the graph. For example, block 102 has three edges, and block 114 has two edges.

CFG 100 includes blocks 102, 104, 106, 108, 110, 112, 114, 116, and 118. Each block represents a portion of a user software program. For example, block 102 can include software instructions that typically begin a function, such as allocating and initializing local variables. Also for example, block 104 can have one or more conditional branch instructions that, based on tests made at run-time, cause execution to branch to block 106 or block 110. The blocks shown in FIG. 1 are also labeled with letters. The letter labeling allows the blocks in CFG 100 to be associated with items in figures other than FIG. 1.

Each block in CFG 100 can be optimized at compile-time or at run-time. When a program is optimized at compile-time, the compiler can optimize every block, or can make "guesses" as to which blocks will provide the most performance improvement if optimized. Optimizations at run-time, however, can take advantage of actual usage patterns, and optimize the code that is actually executed most often. By optimizing the portions of code that execute most frequently, one can gain significant increases in execution speed without optimizing every portion of a program.

In one embodiment of the present invention, counters are maintained for each block within CFG 100. Each time the code in a block is executed at run-time, the counter associated with that block is incremented. After the program has run for a period of time, the counters hold profile information that describes the frequency of execution of the blocks in CFG 100. This is called "block profiling." In another embodiment, counters are maintained for every edge in CFG 100. After the program has run for a period of time, the counters hold profile information that describes the frequency of execution of each edge. This is called "edge profiling." When a sequence of edges are combined in sequence, a "path" is formed. In another embodiment, counters are maintained for paths. This is called "path profiling." One skilled in the art will understand that the method and apparatus of the present invention can be used for block profiling, edge profiling, and path profiling.

As used herein, the term "profiled block" refers to a block that has a profile counter associated therewith. The frequency with which the profiled block executes is measured by the profile counter. A "non-profiled block" refers to a block that does not have a counter associated therewith. A non-profiled block may have profile information derived from profile information of other blocks, or may not be profiled. The term "branch block" refers to a block that includes a branch instruction. A "non-branch block" refers to a block that does not include a branch instruction. The terms "branch block" and "non-branch block" have been chosen to describe blocks including an instruction useful for profiling. Branch blocks include a branch instruction useful for profiling. Non-branch blocks include an instruction useful for profiling other than a branch instruction. Although the terms "branch block" and "non-branch block" have been defined in terms of the existence or non-existence of a branch instruction, instructions other than branch instructions can be used in the same manner, and the terms "branch block" and "non-branch block" are intended to encompass embodiments utilizing instructions other than branch instructions.

Figure 2A:
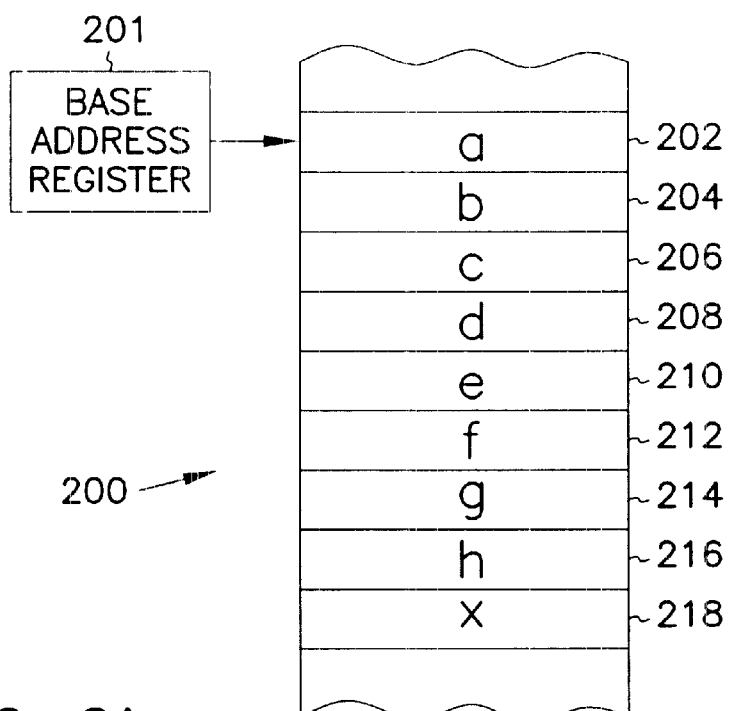
FIG. 2A shows counter locations in memory according to one embodiment of the present invention.

FIG. 2A shows counter locations in a memory according to one embodiment of the present invention. The counter locations in memory 200 correspond to the blocks with like letter labeling as shown FIG. 1. For example, counter location 202, labeled "a," corresponds to block 102, also labeled "a." Each time the code in block 102 is executed at run-time, the value at counter location 202 is incremented. In a like manner, values at counter locations 204, 206, 208, 210, 212, 214, 216, and 218 are incremented when their respective code blocks shown in FIG. 1 are executed. In the embodiment of FIG. 2A, all of the blocks in CFG 100 are profiled blocks because a counter location is maintained for each block. This results in block profiling as previously described.

The counter locations in memory 200 are examples of profile indicators. Profile indicators are modified when a profiled block is executed to gather profile information. In the embodiment of FIG. 2A, the profile indicators are counters, and the counters are addressable in memory 200.

Also shown in FIG. 2A is base address register 201. Base address register 201, as is explained more fully below with reference to FIGS. 4A–4D, points to the memory location of the first counter for the function represented by CFG 100. For example, in the embodiment of FIG. 2A, base address register 201 holds a value that points to counter location 202. Counter locations other than the counter location pointed to by base address register 201 are accessed using base address register 201 in conjunction with other addressing information which is also explained more fully below with reference to FIGS. 4A–4D.

Referring now back to FIG. 1, profiling information for each block in the user program represented by CFG 100 can be gathered without designating each block as a profiled block. For example, profile information for all blocks shown in CFG 100 can be gathered by maintaining counters for blocks 104, 106, 108, 112, and 116. Profile information can be derived for block 110 from the sum of the profile information from blocks 104, 106, and 108. The profile information for blocks 102, 114, and 118 can be derived in a similar manner.

Figure 2B:
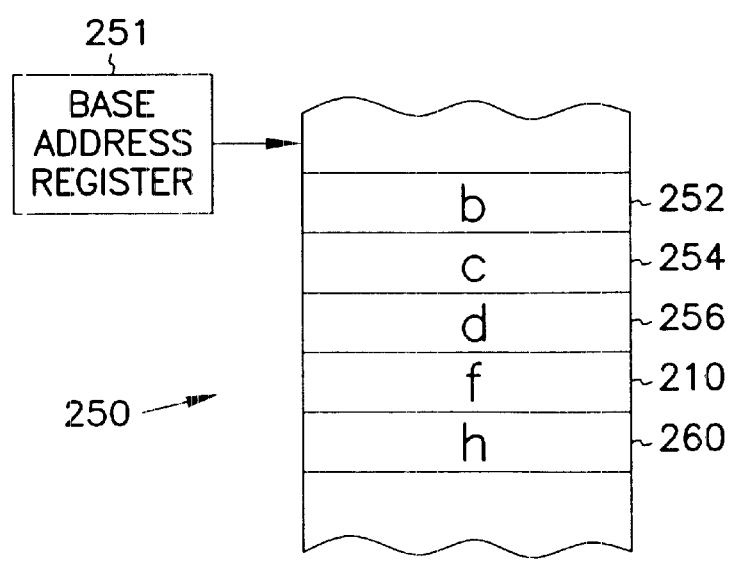
FIG. 2B shows counter locations in memory according to another embodiment of the present invention.

FIG. 2B shows counter locations in a memory in accordance with another embodiment of the present invention. The counter locations in memory 250 correspond to profiled blocks 104, 106, 108, 112, and 116 as just described with reference to FIG. 1. Base address register 251 holds a value that points to the first counter location, which is counter location 252. In the embodiment of FIG. 2B, counter location 252 holds a value that corresponds to the frequency of execution of block 104. This is in contrast to the embodiment shown in FIG. 2A, where the first counter location holds a value that corresponds to the frequency of execution of block 102. In the embodiment of FIG. 2B, blocks 104, 106, 108, 112, and 116 are profiled blocks, and blocks 102, 110, 114, and 118 are non-profiled blocks.

The choice of which blocks to profile can be made using algorithms such as those presented in: D. E. Knuth & F. R. Stevenson, "Optimal measurement of points for program frequency counts," BIT 13 pp. 313–322 (1973). The Knuth algorithm partitions the CFG nodes into equivalent classes, where two nodes are equivalent if they each have an edge from a common node. A graph is constructed with the equivalence classes as nodes and the original CFG blocks as edges, and a maximal spanning tree is selected from the graph. The profiled blocks are the original CFG blocks that are not edges on the spanning tree. Because the method and apparatus of the present invention utilizes already-existing instructions such as branch instructions for profiling (as is more fully explained below), treating blocks without these instructions as having a very large weight in the maximal spanning tree calculation aids in the selection of branch blocks as profiled blocks. Experimental results suggest that the above algorithm results in a frequency of profiled blocks of 31.3%; and of the profiled blocks, 2.3% are non-branch blocks.

Figure 3:
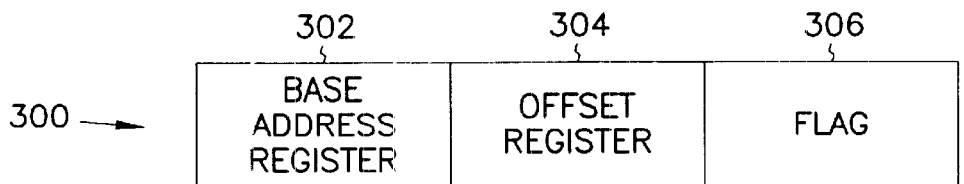
FIG. 3 shows a profiling register.

FIG. 3 shows a profiling register. Profiling register 300 is a hardware register used in the profiling process. Profiling register 300 is used to determine whether profiling is to take place, and if so, which counter location is to be accessed for a particular profiling operation. Flag 306, when set, signifies that profiling should take place. When flag 306 is not set, profiling does not take place. Base address register 302 holds a value that points to a location within a memory. The location pointed to by base address register 302 is the first counter location for the function represented by CFG 100 (FIG. 1), as shown in FIGS. 2A and 2B. Offset register 304 holds a value that, when summed with the value in base address register 302, points to a location corresponding to a region within the function represented by CFG 100 (FIG. 1). The size of base address register 302 and offset register 304 are generally a function of the processor used and the amount of addressable memory. In one embodiment, base address register 302 is 40 bits wide, and offset register 304 is 16 bits wide. Specific counter locations within the memory are addressed by summing the contents of base address register 302 and offset register 304 with information provided by a separate instruction as explained with reference to FIG. 4A.

Figure 4A:
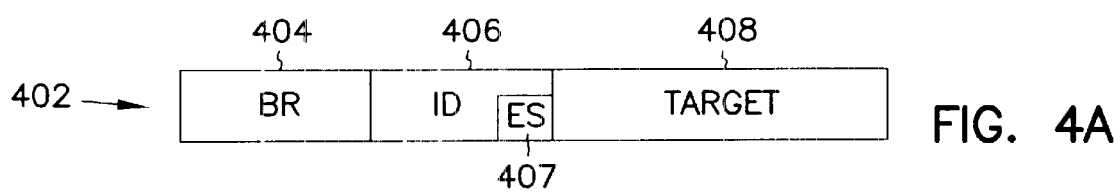
FIGS. 4A–4F show processor instructions.

FIGS. 4A, 4B, 4C, and 4D show processor instructions. FIG. 4A shows a branch instruction in accordance with an embodiment of the invention. Branch instruction 402 includes branch instruction (BR) field 404, identification (ID) field 406, and target address field 408. When branch instruction 402 is executed, a processor interprets BR field 404 as the operations code ("opcode") and determines that this is a branch instruction. The processor interprets target address field 408 as the address to fetch the next instruction if the branch is to take place.

ID field 406 is interpreted by the processor as part of an address of a counter location for profiling purposes. When the processor encounters branch instruction 402, a counter location is determined by summing the contents of base address register 302, offset register 304, and ID field 406. By generating counter locations in this manner, each branch block can correspond to a separate counter location. This is an example of block profiling.

In some embodiments ID field 406 is used for generating addresses of profile counters that represent the frequency of edges rather than blocks. This is an example of edge profiling. In some embodiments, profile counters can be updated when a branch is taken, when the branch is not taken, or regardless of whether the branch is taken. This can be accomplished by dedicating part of ID field 406 as edge selection (ES) field 407. For example, ES field 407 can include two bits for determining what to profile. In one embodiment, the four possible values of 00, 01, 10, and 11 of ES field 407 can correspond to profiling regardless of whether the branch is taken, profiling when the branch is taken, profiling when the branch is not taken, and profiling both when the branch is taken and not taken, respectively. In some embodiments, multiple counter addresses can be generated from one ID field 406. One address can correspond to a taken branch, one address can correspond to a non-taken branch, and one address can correspond to the execution of the branch instruction regardless of whether the branch is taken or not.

Branch instruction 402 is an example of a machine readable instruction that occurs frequently in user programs. By utilizing branch instruction 402 to specify a counter location, instructions already existing in a user program can be utilized for profiling purposes, thereby reducing the need to add profiling instructions to the user program. This results in less overhead, both in terms of program size and execution speed. One skilled in the art will appreciate that instructions other than a branch instruction can be utilized to generate counter locations without departing from the scope of the present invention.

In some embodiments, when ID field 406 has a zero value, branch instruction 402 is not utilized for profiling purposes. For example, if a non-profiled block within a user program includes a branch instruction, the branch instruction can have a zero value in ID field 406, thereby not causing the generation of a counter location for the branch instruction. Also for example, if a profiled block has multiple branch instructions, only one of which is to be used for profiling, the remaining branch instructions can have zero valued ID fields 406.

The size of BR field 404, ID field 406, and target address field 408 are generally a function of the environment within which branch instruction 402 operates. For example, BR field 404 is an opcode that is generally the same size as other opcodes executed by a particular processor. Likewise, target address field 408 includes a sufficient number of bits to specify a branch address, or a portion thereof. The size of ID field 406 determines the number of unique counter locations that can be specified within a region of software, where a region is defined by a single set of values in base address register 302 and offset register 304 (FIG. 3). For example, if ID field 406 is three bits long, a maximum of eight locations can be specified within any one region. Further, when a zero value in ID field 406 is utilized to signify no profiling, the maximum number of locations specified is reduced from eight to seven.

Figure 4B:
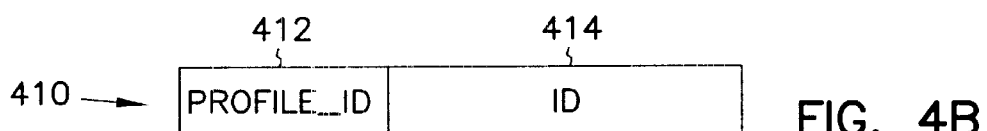

FIG. 4B shows an auxiliary instruction according to one embodiment of the present invention. Auxiliary instruction 410 includes profile ID field 412 and identification (ID) field 414. Auxiliary instruction 410 can be utilized for profiling non-branch blocks. When a non-branch block has been chosen as a profiled block, the addition of auxiliary instruction 410 can facilitate the profiling of the block. When a processor executes auxiliary instruction 410, profile ID field 412 is interpreted such that the processor knows to combine the contents of ID field 414 with the contents of base address register 302 and offset register 304. The profiling effects of auxiliary instruction 410 are substantially equivalent to the profiling effects of branch instruction 402, in part because both ID field 406 and ID field 414 are used for generating addresses.

Figure 4C:
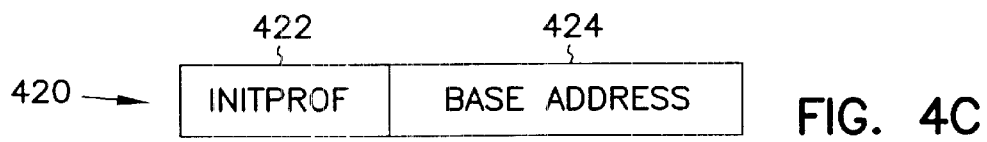

FIG. 4C shows a first profile register initialization instruction in accordance with an embodiment of the present invention. Instruction 420 includes profile initialization (initprof) field 422 and base address field 424. Initprof field 422 is an opcode that, when executed by a processor, causes base address register 302 (FIG. 3) to be loaded with the contents of base address field 424, and also causes offset register 304 to be loaded with zero. Instruction 420 can be used to load base address register 302 and zero offset register 304 when the run-time scope changes. For example, when a function or procedure is entered, instruction 420 can be executed, thereby causing a different set of locations in memory to be addressed when updating profiling counters.

Figure 4D:
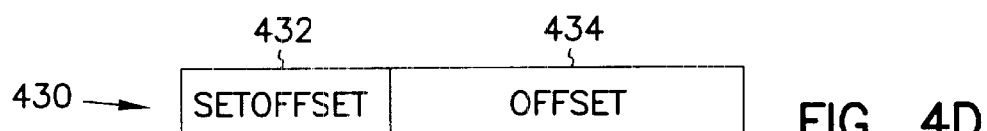

FIG. 4D shows a second profile register initialization instruction in accordance with an embodiment of the present invention. Instruction 430 includes "setoffset" field 432 and offset field 434. Setoffset field 432 is an opcode that, when executed by a processor, causes offset register 304 (FIG. 3) to be loaded with the value of offset field 434. Instruction 430 can be utilized to modify the contents of offset register 304 when the end-user program enters a different region. The effect of executing instruction 430 is to change a region within a memory currently used for counter locations.

Figure 4E:
Figure 4F:
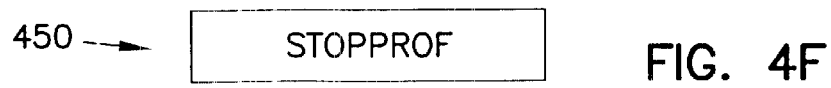

FIG. 4E shows a "startprof" processor instruction, and FIG. 4F shows a "stopprof" processor instruction. Startprof instruction 440, when executed, sets flag 306, and stopprof instruction 450 clears flag 306 (FIG. 3). In some embodiments, startprof instruction 440 inserted at the beginning of a program to effect profiling of the entire program. In other embodiments, startprof instruction 440 and stopprof instruction 450 are placed in a program around an area to be profiled. After startprof instruction 440 is executed and flag 306 is set, profiling occurs, and after stopprof instruction 450 is executed, flag 306 is cleared, and profiling stops.

Figure 5:
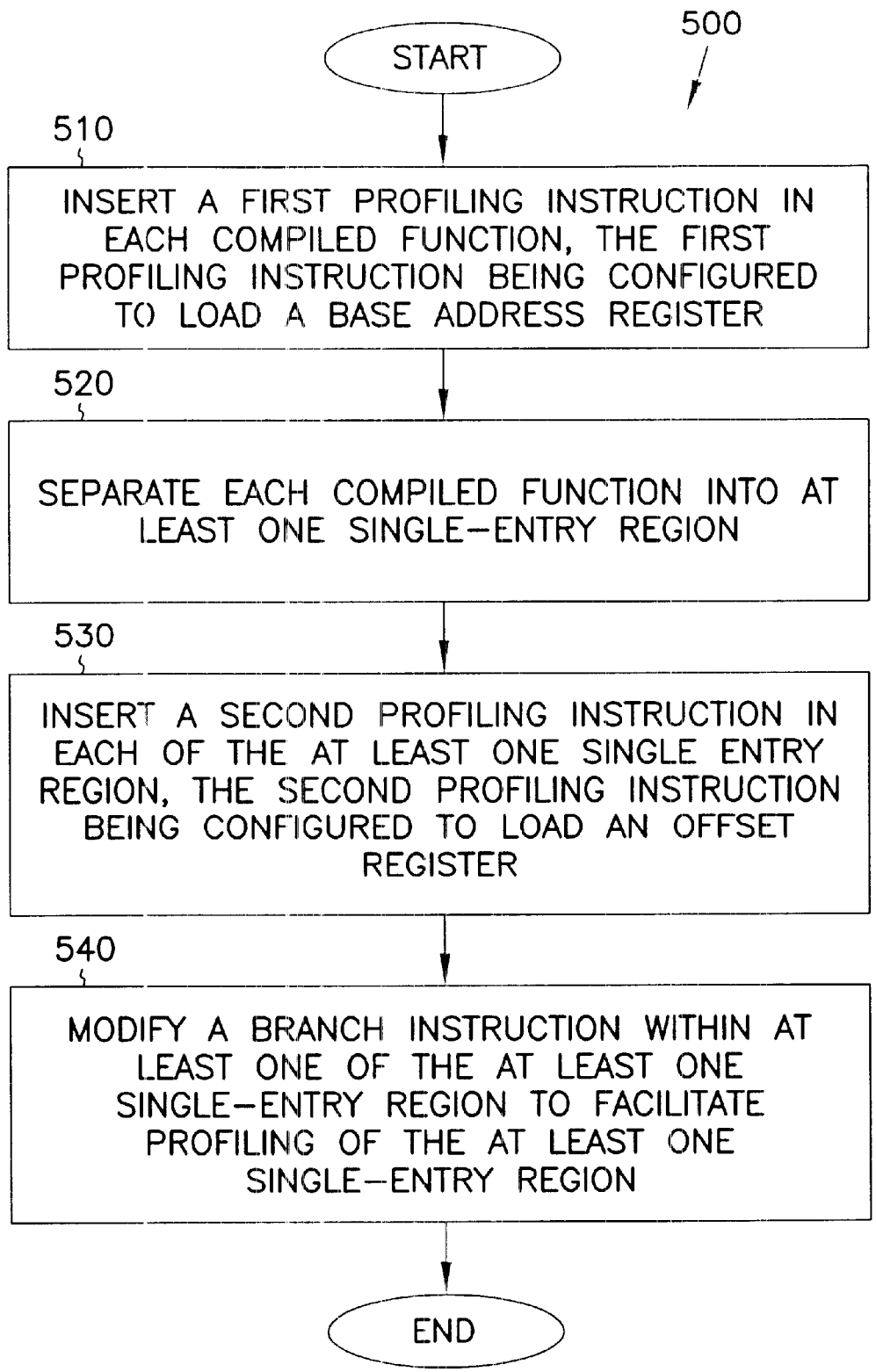
FIG. 5 is a flowchart of a method for instrumenting a user program.

FIG. 5 shows a flowchart of a method of instrumenting a user program. An instrumented program is a program that has had profiling instructions either inserted or modified within the program. Profiling instructions added or modified are also referred to as instrumented profiling instructions. When an instrumented program is executed at run-time, profiling can occur. Method 500 begins in action box 510 when a first profiling instruction is inserted in each compiled element. The compiled element can be a function, procedure, subprogram, or any other element into which a software program is divisible. The term "function" is used with reference to FIG. 5 when describing compiled elements, and is intended to encompass any compiled element into which a software program is divisible. The function referred to in action box 510 can be represented by CFG 100 (FIG. 1). The compiled function is part of a user program, and when the user program consists of a single function, the compiled function is the entire user program. The first profiling instruction inserted in action box 510 corresponds to instruction 420 (FIG. 4C). This instruction is configured to load a base address register. The effect of action box 510 is to define a counter location scope local to each compiled function. At compile-time, each compiled function is assigned a unique value to be loaded in the base address register. When the compiled function runs at run-time, the previous value of the base address register is saved, and the first profiling instruction loads the base address register, thereby defining a new local scope for the function just entered.

In action box 520, each compiled function is separated into at least one single entry region. Lee and Ryder have formulated the problem of partitioning an acyclic flow graph into single entry regions. See Lee, Yong-fong and Ryder, Barbara G., "A Comprehensive Approach to Parallel Data Flow Analysis", Proceedings of the ACM International Conference on Supercomputing, Pages 236–247, July 1992. CFG 100 is a cyclic flow graph, and the size constraint is limited to the number of branch blocks. Accordingly, the Lee and Ryder algorithms can be utilized with the following extensions: 1) limiting the number of branch blocks rather than limiting the number of blocks in a region; 2) allowing cycles within a region as long as the region has only one single entry block; and 3) combining multi-way branches into a single region, thereby avoiding using blocks late in the sequence as region heads, and allowing the multi-way branch instructions to stay together.

In action box 530, a second profiling instruction is inserted in each of the at least one single entry regions defined in action box 520. The second profiling instruction is configured to load an offset register, such as offset register 304 (FIG. 3). In the first single entry region, the second profiling instruction can load a value of zero in the offset register. In some embodiments where the offset register is initialized to zero, the second profiling instruction is omitted from the first single-entry region. In action box 540, a branch instruction is modified within at least one of the single entry regions established in action box 520. The modification of the branch instruction facilitates profiling of the at least one single entry region. Branch instructions are modified in branch blocks that are to be profiled. In non-branch profiled blocks, an auxiliary instruction such as auxiliary instruction 410 (FIG. 4) can be inserted in the block to facilitate profiling of the non-branch profiled block.

The following two pseudocode functions illustrate an example embodiment of an algorithm for partitioning a CFG into single entry regions.

```
/* Partition a CFG into single entry regions with number of profiled
blocks
in each region <=2^K. */
Function Partition(CFG, K)
r_cnt = 0
headqueue = {entry block}
FOR EACH loop
    Find the number of profiled blocks in the loop
While (headqueue is not empty)
    head = dequeue (headqueue)
    Find_SE_Region(head, prof_blk_list, tail_list)
    If number of blocks in prof_blk_list == 0
        Continue
    R[r_cnt].head = head
    R[r_cnt].list = prof_blk_list
    Add blocks in tail_list to headqueue
    r_cnt++
/* End of Function Partition */
/* Find one single-entry region */
Function Find_SE_Region(head, prof_blk_list, tail_list)
tail_list = empty
prof_blk_list = empty
region_blk_bv = all bits cleared
num_prof_blks = 0
workqueue = {head}
WHILE (workqueue is not empty && num_prof_blks < 2^K)
    blk = dequeue(workqueue)
    IF blk is visited
        Continue
    ELSE IF some predecessors of blk in NOT set region_blk_bv
        IF all predecessors are visited
            Add blk to tail_list
        Continue
    ELSE IF blk is in an inner loop of head
        If num_prof_blks + number of profiled blocks in loop <= 2^K
            Add profiled blocks in loop to prof_blk_list
            All loop tail blocks to workqueue
        Else
            Add blk to tail_list
        Continue
    mark blk as visited
    set blk in region_blk_bv
    IF blk needs profiling
```

```
        add blk to prof_blk_list
           num_prof_blks++
Add blocks in workqueue into tail list
/* End of Function Find_SE_Region */
```

Figure 6:
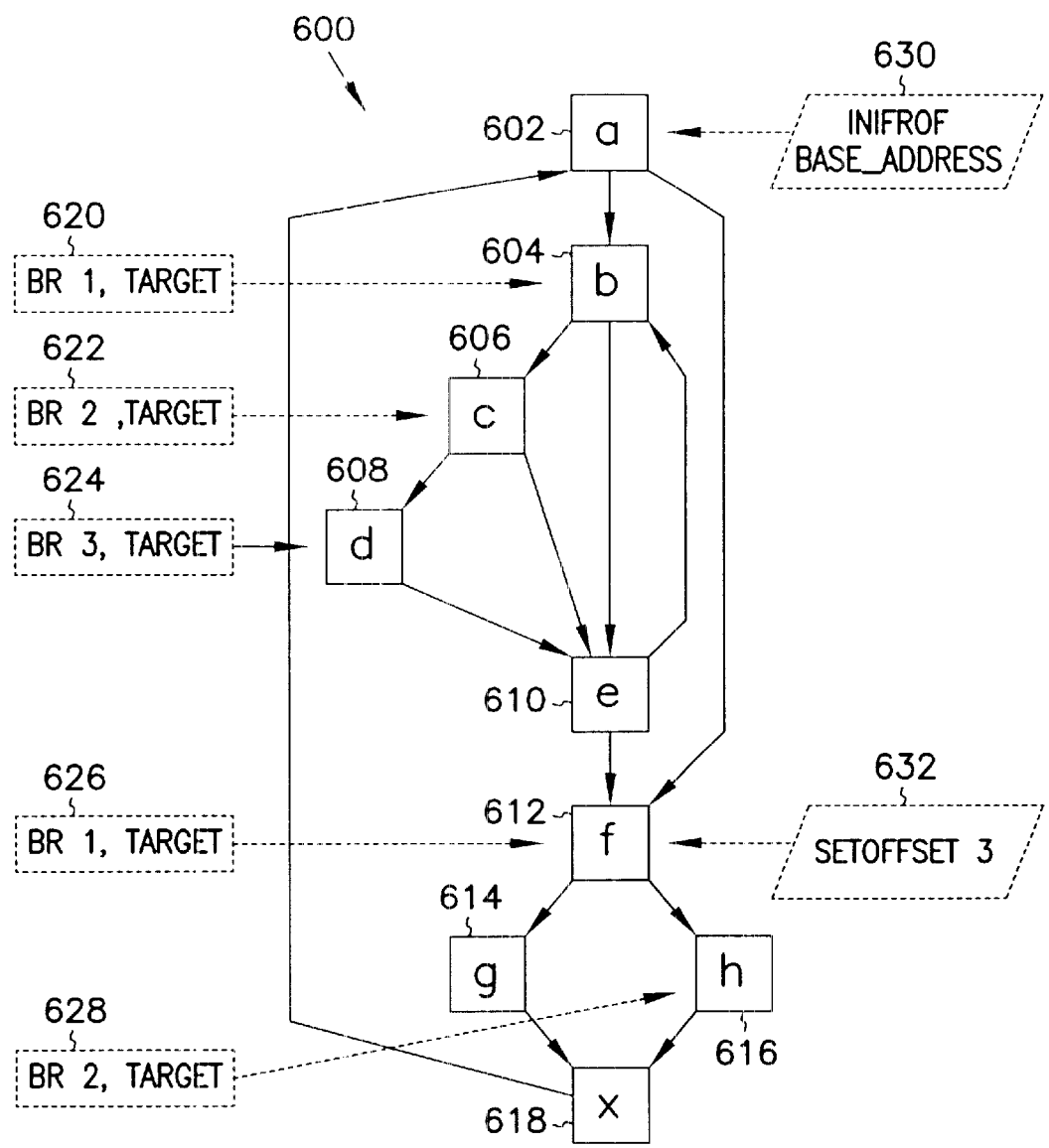
FIG. 6 shows an instrumented control flow graph resulting from the method of FIG. 5.

FIG. 6 shows an instrumented control flow graph resulting from the method of FIG. 5. CFG 600 shows the results of method 500 having been applied to CFG 100 (FIG. 1). The profiled blocks in CFG 600 correspond to the profiled blocks in FIG. 2B. CFG 600 is divided into two single entry regions. The first single entry region has block 602 as a region head, and the second single entry region has block 612 as the region head. Block 602 has instruction 630 added thereto. Instruction 630 corresponds to instruction 420 (FIG. 4C) inserted in the compiled function during compilation as explained with reference to action box 510 (FIG. 5). The initprof instruction is added at the beginning of CFG 600 because when the function is entered, a new local scope is defined.

Block 612 is shown with instruction 632 added. Instruction 632 corresponds to instruction 430 (FIG. 4D) inserted into the region head block at compile-time as explained with reference to action box 530 (FIG. 5). The addition of instructions 630 and 632 within CFG 600 defines the scope for the function represented by CFG 600, and two smaller scopes, one for each region within the function.

Block 604 has instruction 620 therein. Instruction 620 is a branch instruction that takes the form of branch instruction 402 (FIG. 4A). Instruction 620 has not been added to block 604, but rather is an already-existing instruction that has been modified. The modification of instruction 620 is in the ID field. The ID field of instruction 620 has been set to a value of one. In the embodiment of FIG. 6, a zero value within the ID field represents no profiling. Since the zero value of the ID field is not used, the correct counter location for the branch instruction is computed as base address register contents plus offset register contents plus ID field value minus 1. Blocks 606 and 608 have instructions 622 and 624 included therein. ID fields within instructions 622 and 624 have been modified to have consecutive values following instruction 620. One can see, therefore, that the region including blocks 602, 604, 606, 608, and 610 includes three profiled blocks, each including a branch instruction.

Referring now back to FIG. 2B, memory 250 corresponds to the memory maintained for profiling the function represented by CFG 600 of FIG. 6. When instruction 630 is executed at run-time, the base address register is initialized to point to memory location 252 as shown in FIG. 2B. When branch instruction 620 is executed within block 604, the counter location within memory 250 is computed as the contents of the base address register plus the contents of the offset register plus the value of the ID Field of instruction 620 minus 1. The resulting counter location is location 252 as shown in FIG. 2B. Branch instructions 622 and 624, by virtue of their consecutively numbered ID fields, cause counter locations to be computed as memory locations 254 and 256 respectively.

Block 612 has instruction 632 included therein at compile-time. Instruction 632 loads the offset register with a value of three. At compile-time, the software compiler computes the offset value of three as the sum of previously modified branch instructions and added auxiliary instructions within the scope of CFG 600, namely instructions 620, 622, and 624. Block 612 also has a modified branch instruction 626. Branch instruction 626 has an ID field value of one. The counter location address corresponding to branch instruction 626 is computed as the contents of the base address register plus the contents of the offset register plus the value of the ID field of instruction 626 minus 1. One can see, therefore, that the counter location within memory 250 corresponding to branch instruction 626 is memory location 258. Likewise, one skilled in the art will understand that modified branch instruction 628 included within block 616 corresponds to counter location 260 within memory 250. Each profiled block within CFG 600 is a branch block, and so no auxiliary instructions were added at compile time. If one of the profiled blocks had been a non-branch block, an auxiliary instruction would have been added to facilitate profiling of that block.

Figure 7:
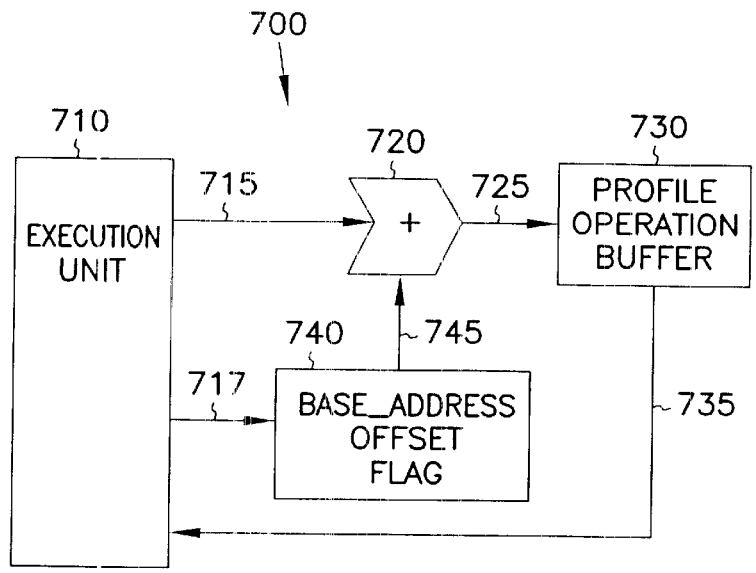
FIG. 7 shows a processor in accordance with one embodiment of the invention.

FIG. 7 shows a processor in accordance with one embodiment of the invention. Processor 700 includes execution unit 710, register 740, address generator 720, and profile operation buffer 730. In some embodiments, execution unit 710 is multiple physical processors, each capable of executing one or more multiple instructions simultaneously. In other embodiments, execution unit 710 is a single processor capable of executing multiple instructions simultaneously.

Execution unit 710 executes an end-user program such as the program represented by CFG 600 (FIG. 6) that includes instrumented profiling instructions. Register 740 includes a base address field, an offset field, and a flag such as those shown in FIG. 3. When execution unit 710 executes an initprof instruction, execution unit 710 loads the base address field of register 740 with the value of the base address field within the initprof instruction, and loads the offset field with a value of zero. When execution unit 710 executes a setoffset instruction, the offset field of register 740 is set to the value of the offset field included within the setoffset instruction.

When execution unit 710 executes an instruction that includes an ID field for profiling, such as branch instruction 402 (FIG. 4A) or auxiliary instruction 410 (FIG. 4B), execution unit 710 sends the value of the ID field on node 715 to address generator 720. Address generator 720 receives the value of the ID field on node 715, and also receives the value of register 740 on node 745. Address generator 720 sums the value of the base address field, the offset field, and the ID field to create an address on node 725. The address on node 725 corresponds to a memory location within which a counter is maintain for a profiled block. For example, when execution unit 710 executes branch instruction 628 (FIG. 6), the value of the address generated by address generator 720 corresponds to location 260 (FIG. 2B).

Profile operation buffer 730 receives the address on node 725, and generates update operations appropriate for incrementing a counter. In one embodiment, the update operations generated by profile operation buffer 730 include a load instruction, an increment instruction, and a store instruction. In another embodiment in which execution unit 710 is capable of loading a value, incrementing the value and storing it to memory in one operation, profile operation buffer 730 generates one operation for each address.

In the embodiment illustrated in FIG. 7, update operations generated in profile operation buffer 730 are executed within execution unit 710. Profile operation buffer 730 inserts update operations into a pipeline of execution unit 710 during free slots. Free slots are unused instruction cycles within execution unit 710. For example, in a processor capable of executing multiple instructions within a single cycle, one or more free slots may be available in a cycle. Also for example, in a processor capable of executing a single instruction within a single cycle, free cycles may become available during a branch when the pipeline is being flushed and new instructions are being fetched. One skilled in the art will appreciate that update operations generated in profile operation buffer 730 are executed within execution unit 710 in an asynchronous fashion with respect to the original end-user program being executed within execution unit 710. By allowing asynchronous execution and possibly long latencies for instructions within profile operation buffer 730, update operations that update counters can be executed with very low overhead.

Profile operation buffer 730 can buffer a large number of profiling instructions, thereby accommodating non-uniform distribution of available free slots. For example, if many profiled blocks are encountered by execution unit 710 such that many update operations are generated within profile operation buffer 730 during a time period having few free slots, the generated instructions can be buffered in profile operation buffer 730. These buffered instructions await free slots in execution unit 710. In some embodiments, profile operation buffer 730 is a circular buffer, that when full, can overrun. In these embodiments, if profile operation buffer 730 overruns, some buffered instructions may be discarded. The discarding of buffered instructions reduces the overall accuracy of profiling the end-user software, in exchange for reduced overhead. In other embodiments, prior to profile operation buffer 730 overrunning, buffered instructions are scheduled into otherwise non-free slots, thereby incurring overhead. In these embodiments, profiling accuracy is increased at the expense of increased overhead.

Figure 8:
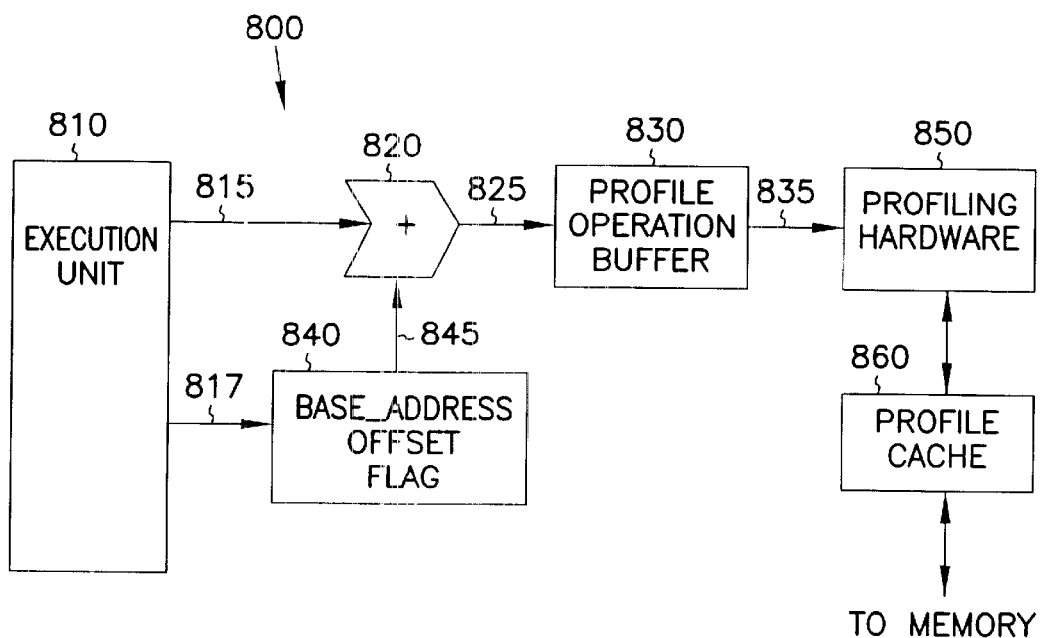
FIG. 8 shows a processor in accordance with another embodiment of the invention.

FIG. 8 shows a processor in accordance with another embodiment of the invention. Processor 800 includes execution unit 810, address generator 820, register 840, profile operation buffer 830, profiling hardware 850, and profile cache 860. Execution unit 810 operates in a substantially equivalent manner to execution unit 710 (FIG. 7) except that execution unit 810 does not execute instructions that increment profiling counters. When execution unit 810 executes an initprof instruction, the base address field and the offset field of register 840 are updated. The base address field receives a value specified in the initprof instruction, and the offset field is set to zero. When execution unit 810 executes a setoffset instruction, the offset field within register 840 is set to the value specified in the setoffset instruction. The operation of execution unit 810 when executing initprof and setoffset instructions is substantially equivalent to the operation of execution unit 710 (FIG. 7).

When execution unit 810 executes an instrumented profiling instruction including an ID field, such as branch instruction 402 (FIG. 4A) or auxiliary instruction 410 (FIG. 4B), the ID value is sent to address generator 820 on node 815. This operation of execution unit 810 is also substantially equivalent to the operation of execution unit 710 (FIG. 7). Address generator 820 generates an address on node 825 from the ID field on node 815 and from the contents of register 840. Profile operation buffer 830 generates instructions for updating profiling counters in a manner similar to profile operation buffer 730 (FIG. 7). In one embodiment, profile operation buffer 830 generates a load instruction, an increment instruction, and a store instruction for each address on node 825.

Instructions generated by profile operation buffer 830 are delivered to profiling hardware 850 on node 835. One skilled in the art will understand that node 835 can be a bus capable of sending a substantial amount of information in a parallel fashion from profile operation buffer 830 to profiling hardware 850. In some embodiments, profiling hardware 850 is hardware dedicated to executing instructions generated by profile operation buffer 830. In other embodiments, profiling hardware 850 is shared hardware capable of performing functions in addition to profiling operations. Profiling hardware 850 communicates with profile cache 860, which in turn communicates with memory that includes profiling counters.

In embodiments in which profiling hardware 850 executes load, increment, and store instructions, profiling hardware 850 loads into an internal register a counter value specified by the address on node 825. Profile cache 860 may not include the counter value specified by the load instruction, in which case a period of time equal to the cache latency will lapse before the counter value is loaded into profiling hardware 850. Once the counter value is loaded into profiling hardware 850, an increment instruction can be executed to increment the counter value. The counter value can then be stored back to memory through profile cache 860.

The embodiment of FIG. 8 includes profiling hardware 850 for executing profiling instructions generated in profile operation buffer 830. The addition of profiling hardware 850 off-loads the execution of profile counter update instructions from execution unit 810, thereby reducing the profiling overhead incurred by an end-user program running on processor 800.

Figure 9:
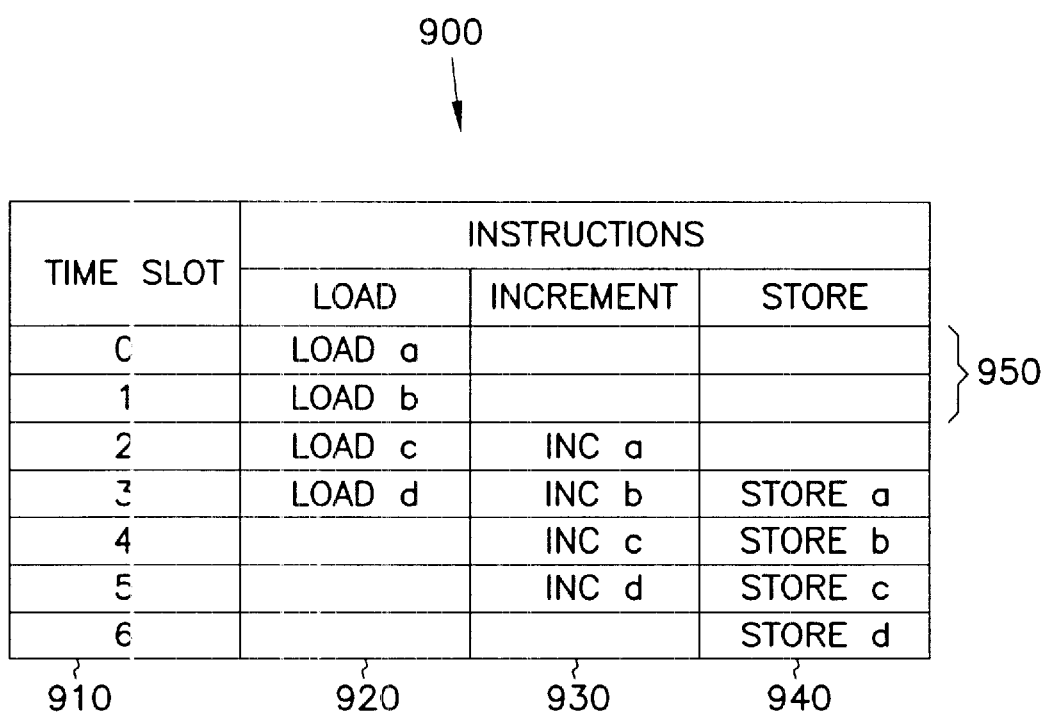
FIG. 9 shows a profile operation buffer in accordance with one embodiment of the invention.

FIG. 9 shows a profile operation buffer in accordance with one embodiment of the invention. Profile operation buffer 900 can correspond to profile operation buffer 730 (FIG. 7) or profile operation buffer 830 (FIG. 8). Profile operation buffer 900 includes load instructions 920, increment instructions 930, and store instructions 940 arranged in different time slots 910. The load, increment, and store instructions included within profile operation buffer 900 are arranged in groups called tuples. For example, when block "a" is to be profiled, a tuple of instructions is generated. The tuple includes a "load a" instruction, an "increment a" instruction, and a "store a" instruction. The tuple of instructions is dispersed across time slots 910 such that not all three instructions are executed in the same time slot. The load instruction is executed in time slot zero, the increment instruction is executed in time slot two, and the store instruction is executed in time slot three. The store instruction follows the increment instruction by a single cycle because once the value is incremented, it is immediately available to be stored. The increment instruction, however, follows the load instruction by a number of cycles 950 equal to or greater than a cache latency. Referring now back to FIG. 8, if the counter value is not included within profile cache 860, a number of cycles will lapse subsequent to the issuance of the load instruction and prior to the actual loading of the counter value. This is the cache latency. When profile operation buffer 900 corresponds to profile operation buffer 830 (FIG. 8), cache latency 950 corresponds to the latency of profile cache 860 plus the latency of any other cache disposed between profile cache 860 and the memory holding counter values. When profile operation buffer 900 corresponds to profile operation buffer 730 (FIG. 7), cache latency 950 corresponds to the latency of any cache memory coupled to execution unit 710, and the impact of profile operations on a user program are reduced.

Some processors are capable of executing multiple instructions in a single cycle. Also, some processors group multiple instructions for execution within a single cycle. When instructions are grouped into multiples of three, and when a group of three is free, profile operation buffer 900 can insert three instructions in a single time slot into a single cycle of the processor. For example, when three free slots exist in a single cycle, profile operation buffer 900 can insert the three instructions corresponding to time slot three into the buffer. In this example, the "load d" instruction, the "inc b" instruction, and the "store a" instruction are inserted into a single cycle of the processor.

Figure 10:
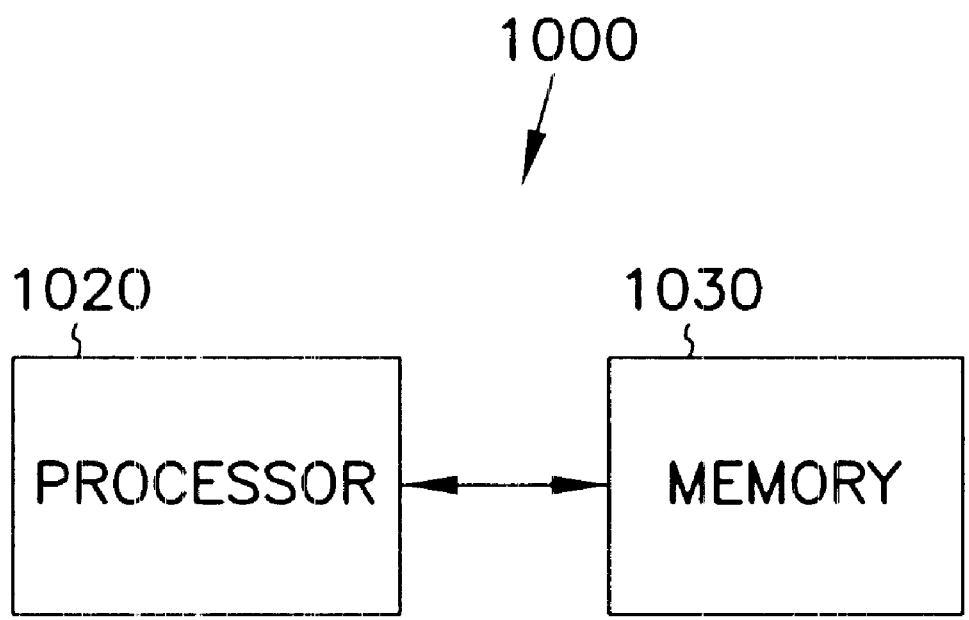
FIG. 10 shows a processing system.

FIG. 10 shows a processing system according to one embodiment of the invention. Processing system 1000 includes processor 1020 and memory 1030. In some embodiments, processor 1020 is a processor capable of executing profiling instructions at run-time, such as processor 700 (FIG. 7), or processor 800 (FIG. 8). Processor 1020 can also be a processor capable of compiling and instrumenting software at compile-time. Processing system can be a personal computer (PC), mainframe, handheld device, portable computer, set-top box, or any other system that includes software.

In some embodiments, processor 1020 includes cache memory, a memory controller, or a combination of the two. In these embodiments, processor 1020 may execute profile counter update instructions without accessing memory 1030. In other embodiments, profiling counters are maintained within memory 1030, and processor 1020 accesses memory 1030 when updating profiling counters regardless of whether processor 1020 includes cache memory or memory controllers. Processing system 1000 can efficiently profile end-user programs executed from memory 1030 through the combined use of software profiling instructions and special-purpose hardware within processor 1020.

Memory 1030 can be a hard disk, a floppy disk, random access memory (RAM), read only memory (ROM), flash memory, or any other type of machine medium readable by processor 1020. Memory 1030 can store instructions for performing the execution of the various method embodiments of the present invention such as method 500 (FIG. 5) and method 1100, discussed below with reference to FIG. 11.

Figure 11:
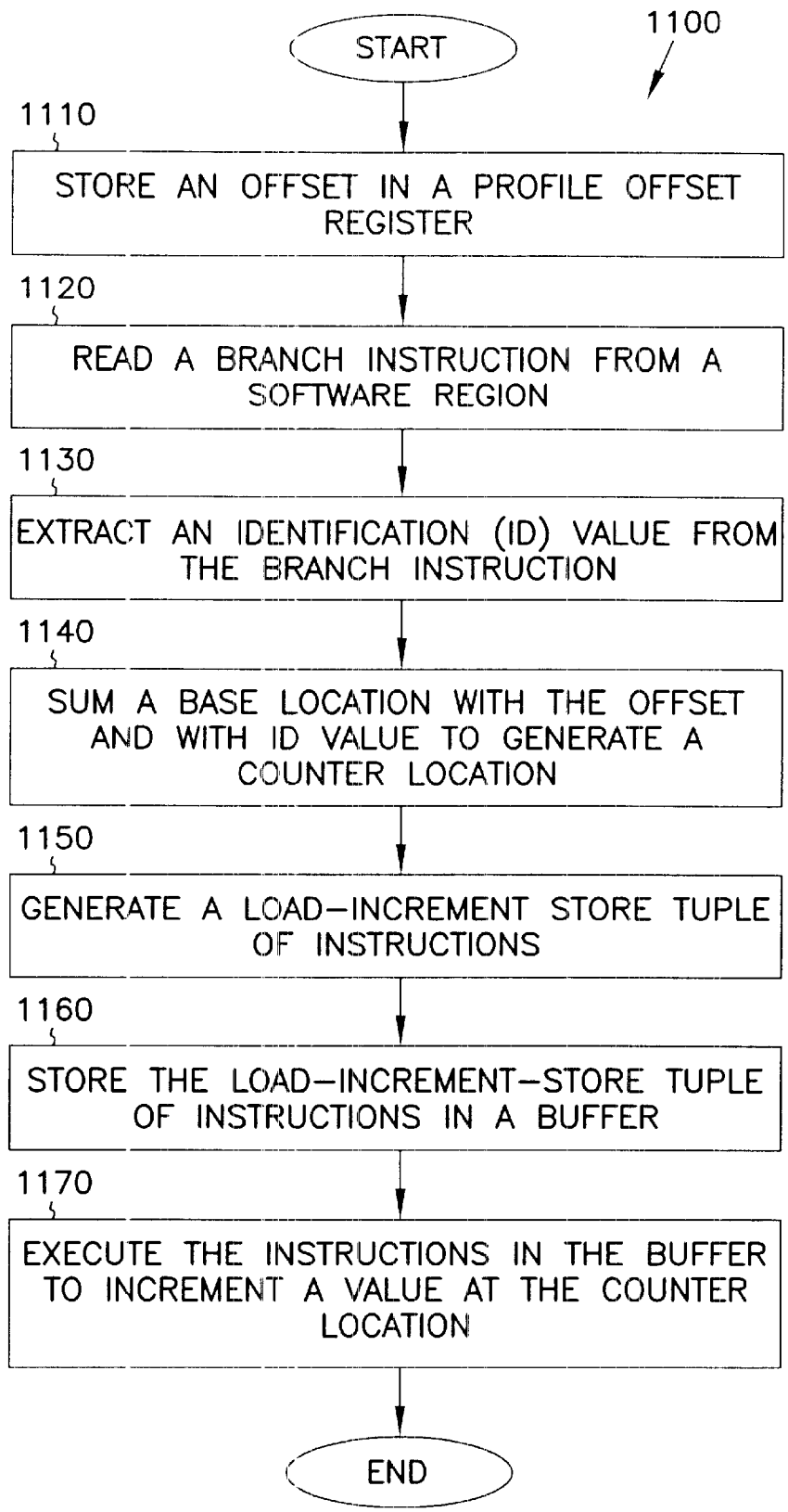
FIG. 11 is a flowchart of a method of profiling a user program.

FIG. 11 is a flowchart of a method of profiling a user program. Method 1100 begins in action box 1110 when an offset is stored in a profile offset register. An offset is stored in the profile offset register when a single entry region of a software function is entered. For example, referring now to FIG. 6, when block 612 is entered, the profile offset register is loaded in block 612 by instruction 632. In action box 1120, a branch instruction is read from the software region, and in action box 1130, an ID value is extracted from the branch instruction. The branch instruction of action boxes 1120 and 1130 can be, for example, branch instruction 628 in block 616 (FIG. 6). In this example, the ID value extracted from the branch instruction is equal to two.

At this point, a determination can be made whether or not to proceed with profiling. Flag 306 (FIG. 3) can be checked, and if not set, profiling can stop. In this case, no profiling takes place in the user program. If flag 306 is set, indicating that profiling is to occur, the ID value extracted from the branch instruction can be checked for a zero value. If the ID value is zero, this branch instruction is not profiled, even though other branch instructions within the user program may be profiled. If the ID value is non-zero, method 1100 continues.

In action box 1140, a base location is summed with the offset, and is also summed with the ID value to generate a counter location. Continuing with the example of block 616 in FIG. 6, the counter location of action box 1140 is generated as the sum of base address register 251, the offset value of three (set by instruction 632 in block 612), and the ID value of two from branch instruction 628, minus one. The resulting counter location is shown as location 260 in FIG. 2B. In action box 1150, a load-increment-store tuple of instructions is generated. The load-increment-store tuple of instructions is generated utilizing the address that points to the counter location of interest. For example, referring now to FIG. 7, profile operation buffer 730 can produce a load-increment-store tuple of instructions utilizing the address information on node 725. Also for example, referring now to FIG. 8, profile operation buffer 830 can produce a load-increment-store tuple of instructions for incrementing a profiling counter.

In action box 1160, the load-increment-store tuple of instructions is stored in a buffer such as profile operation buffer 730 (FIG. 7), or profile operation buffer 830 (FIG. 8). The buffer in which the tuple of instructions is stored in action box 1160 can be a circular buffer having a fixed size. When the fixed size of the circular buffer is exceeded, the load-increment-store tuple of instructions can be discarded at the expense of profiling accuracy. The buffer of action box 1160 can also be an elastic buffer having a variable size. As load-increment-store tuples are created, the buffer size increases. Also, as load-increment-store tuples of instructions are executed, the buffer size decreases.

In action box 1170, the instructions in the buffer are executed to increment a value at the counter location generated by the actions in action box 1140. The instructions executed in action box 1170 can be executed by an execution unit such as execution unit 710 (FIG. 7) that is also executing an end-user program being profiled. The instructions executed in action box 1170 can also be executed by profiling hardware such as profiling hardware 850 (FIG. 8), thereby not impacting an execution unit that is executing an end-user program.

CONCLUSION

An efficient software profiling technique utilizing a combination of software resources and hardware resources has been described. Control flow graphs are partitioned into single entry regions and then further into blocks. Blocks are separated into profiled blocks and non-profiled blocks. Each profiled block has an existing instruction modified, or an auxiliary instruction added, thereby allowing the generation of a profiling counter address with little or no overhead in terms of end-user program execution speed. A register set is maintained that defines the scope for functions or procedures. The register set includes a base address register and an offset register. Profile counter addresses are generated from the register contents and information included in instructions within profiled blocks.

When a profiled block is encountered in end-user program, a profiling counter is incremented. The incrementing of the profile counter is accomplished using instructions generated as a function of the address of the profiling counter. The instructions are maintained in a buffer and are executed during free slots of an execution unit, or by profiling hardware separate from the end-user program execution unit. The profiling buffer includes instructions to load, increment, and store the value at the profiling counter location. Load and increment instructions can be issued separated in time by a value greater than or equal to a cache latency.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A processor comprising:
   an execution unit configured to produce profiling information and to carry out a function unrelated to the profiling information after encountering an instrumented program instruction in a user program, wherein the instrumented program instruction itself includes at least one field identifying one of a plurality of profile indicators and includes an opcode specifying the unrelated function in the user program; and
   a buffer adapted to receive the profiling information from the execution unit so as to modify the one profile indicator as the execution unit executes the user program.

2. The processor of claim 1 wherein the profiling information includes a profile counter address, the processor further comprising profiling hardware for executing a plurality of profile counter update instructions.

3. The processor of claim 1 wherein the profiling information includes at least one profile counter location, the buffer being further adapted to increment contents of the at least one profile counter location.

4. The processor of claim 1 wherein the opcode specifies a branch function in the user program.

5. The processor of claim 1 wherein the execution unit is configured to load the buffer with a plurality of profile counter update instructions when an instrumented profiling instruction is encountered in a user program.

6. The processor of claim 5 wherein the instrumented profiling instruction is a branch instruction.

7. The processing system of claim 5 wherein the profiling counter update instructions comprise:
   a load instruction;
   an increment instruction; and
   a store instruction.

8. The processing system of claim 5 wherein
   the execution unit includes a pipeline for executing program instructions;
   the buffer inserts the plurality of counter update instructions into the pipeline during cycles of the pipeline that are unused by the program instructions.

9. The processing system of claim 5 wherein the profiling counter update instructions comprise:
   a load instruction;
   an increment instruction; and
   a store instruction.

10. The processor of claim 1 further comprising profiling hardware separate from the execution unit and coupled to the buffer to execute only profiling instructions to modify the profile indicators.

11. The processor of claim 10 where the profiling hardware executes the profiling instructions concurrently with instructions in the user program.

12. A processing system comprising:
   a memory device to store both a plurality of profile indicators and program instructions of a user program, the program instructions including instrumented profiling instructions that include within themselves data identifying different ones of the profile indicators;
   a processor coupled to the memory device and to the motherboard, the processor comprising:
   a buffer to hold profile indicator update instructions; and
   an execution unit configured to load the buffer after reading the instrumented profiling instructions from the memory and to execute the profile indicator update instructions during free slots in the user program.

13. The processing system of claim 12 wherein the instrumented profiling instruction is a branch instruction, and the execution unit is configured to load the buffer if the branch instruction results in a program execution branch.

14. The processing system of claim 12 wherein the instrumented profiling instruction is a branch instruction, and the execution unit is configured to load the buffer if the branch instruction does not result in a program execution branch.

15. The processing system of claim 12 wherein the profile indicators are counters incremented by an increment instruction.

16. The processing system of claim 15 wherein the profiling counter update instructions comprise:
   a load instruction;
   the increment instruction; and
   a store instruction.

17. The processing system of claim 12 further comprising a motherboard to mount both the processor and the memory device.

18. A computer-implemented method comprising:
   reading from a program an instrumented instruction containing within itself both an opcode and a designation of one of a plurality of profile indicators;
   in response to the designation, modifying the one profile indicator to reflect a frequency of execution of the instrumented instruction;
   in response to the opcode, performing a program function unrelated to modifying the profile indicator.

19. The method of claim 18 where modifying the one profile indicator includes incrementing the indicator.

20. The method of claim 18 where the opcode designates a branch function.

21. The method of claim 20 where the one profile indicator is modified only for one or more selected outcomes of the branch function.

22. The method of claim 21 where the one or more outcomes are selected in the instrumented instruction itself.

23. The method of claim 18 where the instrumented instruction further includes within itself an edge-select field, and further comprising performing the modifying operation in response to the edge-select field.

24. The method of claim 23 where the edge-select field specifies a condition arising from at least one instruction in the program.

25. The method of claim 23 where the edge-select field specifies a condition arising from the instrumented instruction itself.

26. The method of claim 25 where:
   the program function is a branch operation;
   the condition concerns whether or not the branch is taken.

27. The method of claim 18 further comprising:
   reading from the program a profile initialization instruction containing at least one address;
   establishing the plurality of profile indicators in response to the one address.

28. The method of claim 27 where the one address is a base address.

29. The method of claim 27 where the one address is an offset address.

30. The method of claim 27 where the designation in the instrumented instruction specifies a profile indicator relative to the one address.

31. The method of claim 18 further comprising:

reading from the program a profile initialization instruction;

controlling the modifying operation in response to the profile initialization instruction.

32. The method of claim 31 where the control instruction is a profile start instruction to start the modifying operation.

33. The method of claim 31 where the control instruction is a profile stop instruction to stop the modifying operation.

34. The method of claim 18 where the generating operation stores the at least one update instruction for subsequent execution.

35. The method of claim 34 where the generating operation comprises:

determining a free slot in the execution of the program;

executing the at least one update instruction in at least the one free slot.

36. The method of claim 34 where the generating operation inserts the at least one update instruction into a pipeline during an unused cycle of the pipeline.

37. A machine readable medium including instructions for carrying out the computer-implemented method of claim 18.

38. A processor comprising:

an execution unit configured to produce profiling information after encountering an instrumented program instruction in a user program, wherein the instrumented program instruction itself includes at least one field identifying one of a plurality of profile indicators; and a buffer adapted to receive the profiling information from the execution unit so as to modify the one profile indicator as the execution unit executes the user program, wherein the buffer schedules execution of the plurality of profile counter update instructions during free slots of the execution unit, wherein free slots are unused slots that execute in parallel with user program instructions.

* * * * *